United States Patent [19]

Li

[11] Patent Number: 4,551,156
[45] Date of Patent: Nov. 5, 1985

[54] PERMSELECTIVE MEMBRANE COMPOSITIONS FOR GAS SEPARATIONS AND PROCESS FOR THE SEPARATION OF GASES THEREWITH

[75] Inventor: George S. Li, Macedonia, Ohio

[73] Assignee: Standard Oil Company, Cleveland, Ohio

[21] Appl. No.: 570,816

[22] Filed: Jan. 16, 1984

[51] Int. Cl.$^4$ .............................................. B01D 53/22
[52] U.S. Cl. ............................................ 55/16; 55/68; 55/158; 525/393; 525/905
[58] Field of Search ........................... 55/16, 68, 158; 210/500.2; 264/298; 525/390, 393, 905; 528/22, 28, 32, 43

[56] References Cited

U.S. PATENT DOCUMENTS

| | | | |
|---|---|---|---|
| Re. 30,351 | 7/1980 | Hoehn et al. .............................. | 55/16 |
| 3,350,844 | 11/1967 | Robb ........................................ | 55/16 |
| 3,417,053 | 12/1968 | Chalk ...................................... | 525/393 |
| 3,522,326 | 7/1970 | Bostick et al. .................... | 525/905 X |
| 3,539,657 | 11/1970 | Noshay et al. .................... | 525/905 X |
| 3,558,741 | 1/1971 | Holub et al. ....................... | 525/905 X |
| 3,657,113 | 4/1972 | Stancell et al. ...................... | 55/16 X |
| 3,668,273 | 6/1972 | Krantz .................................. | 525/393 |
| 3,754,375 | 8/1973 | Bouchilloux et al. .................. | 55/16 |
| 4,033,731 | 7/1977 | Bargain et al. ......................... | 55/16 |
| 4,156,597 | 5/1979 | Browall ................................. | 55/16 |
| 4,230,463 | 10/1980 | Henis et al. ............................ | 55/16 |
| 4,243,701 | 1/1981 | Riley et al. ........................... | 427/244 |
| 4,353,802 | 10/1982 | Hara et al. ........................... | 210/654 |
| 4,386,944 | 6/1983 | Kimura ............................... | 55/158 X |
| 4,393,113 | 7/1983 | Sugie et al. .......................... | 55/16 X |
| 4,406,673 | 9/1983 | Yamada et al. ......................... | 55/16 |
| 4,427,419 | 1/1984 | Li ........................................ | 55/16 |
| 4,444,662 | 4/1984 | Conover ............................... | 55/16 X |

Primary Examiner—Robert Spitzer

[57] ABSTRACT

Novel permselective membrane compositions comprise a crosslinked polymer membrane. The polymer membrane has from about 25 to 100 parts by weight of a polyarylene having the formula

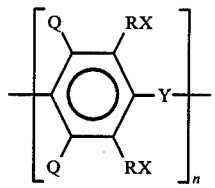

and from about 0 to 75 parts by weight of a crosslinkable copolymer, the copolymer being present at least when the polyarylene component is devoid of crosslinkable cites. The foregoing polymer or polymer mixture is crosslinked by a silicon-containing amineterminated compound selected from the group consisting of the siloxanes having the formula

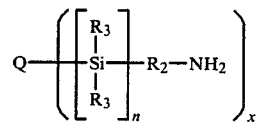

and silanes having the formula

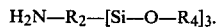

$H_2N-R_2-[Si-O-R_4]_3$.

A process is provided for the separation of gases from a mixture containing at least two gases and includes the step of passing the gas mixture over the permselective membrane composition of the present invention.

33 Claims, No Drawings

PERMSELECTIVE MEMBRANE COMPOSITIONS FOR GAS SEPARATIONS AND PROCESS FOR THE SEPARATION OF GASES THEREWITH

TECHNICAL FIELD

Separation of gases by semipermeable membranes is fairly well known and constitutes a time and energy saving method over older technologies wherein gases are separated by liquefaction or chemical absorption or reaction techniques. Improved semipermeable membranes having greater life and lower cost have been continually sought.

The present invention relates to a novel permselective membrane for the separation of gases. A process for the separation of gases employing such membranes is also provided. The novel membrane is semipermeable meaning that it is selective for specific gas molecules. It comprises a mixture of polymers, as will be discussed hereinbelow, to provide high selectivity, high strength and solvent resistance without sacrifice of permeability. The membrane can be fabricated into hollow fibers, as is known in the art, and arranged in bundles carried in larger diameter tubes for countercurrent separation of large volumes of gas mixtures on a continuous basis.

BACKGROUND ART

Multicomponent membranes are known as are processes for the separation of gases therewith. Such membranes employ a polymer membrane porous to gases which carries a polymer coating occluding the pores of the first. U.S. Pat. No. 4,230,463 describes in detail these multicomponent membranes and discloses a plurality of organic polymers for use as the porous separation membrane including polysulfone, copolymers of styrene and acrylonitrile, polycarbonate and cellulose acetate. Coating materials also include a variety of polymers such as polysiloxane, polyisoprene, alpha-methylstyrene and polysiloxane copolymers and polystyrene. The multicomponent membrane can be employed to separate selectively at least one gas such as hydrogen from a mixture comprising carbon monoxide, carbon dioxide, helium, nitrogen, oxygen, argon, hydrogen sulfide, nitrous oxide, ammonia and $C_1$ to $C_5$ hydrocarbons.

An earlier U.S. Pat. No. 3,350,844 provides a process for the separation of helium, hydrogen or oxygen from a mixture of gases containing nitrogen or a hydrocarbon such as methane and one of the foregoing. The process employs a polyarylene oxide membrane. The polymer film is not crosslinked and therefore has poor solvent resistance necessitating that the gas mixtures be relatively pure. Crosslinking of polymeric materials for use as semipermeable membranes is known from U.S. Pat. No. 4,353,802, however, the membranes are employed for desalination of water by reverse osmosis rather than for gas separation.

Thus, the art of which I am aware has not provided a semipermeable membrane, highly selective for certain gases in a mixture, particularly mixtures of carbon dioxide and methane. Nor, have existing membranes possessed improved strength, flexibility and solvent resistance.

DISCLOSURE OF THE INVENTION

In general, the permselective membrane composition of the present invention comprises from about 25 to 100 parts by weight of a polyarylene having the formula

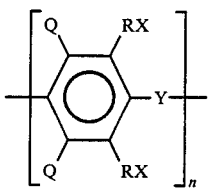

wherein R is a $C_1$ to $C_8$ aliphatic radical, a $C_5$ to $C_7$ cycloaliphatic radical, a $C_1$ to $C_8$ alkoxy radical, a $C_6$ to $C_{12}$ aryl radical, an aralkyl radical or an alkaryl radical, each radical being free of a tertiary alpha-carbon atom; X is H, Cl or Br; Y is a divalent oxygen or sulfur atom or a sulfonyl or carbonate group; Q is H, Cl, Br, or a sulfonyl radical of the formula

where $R_1$ is a $C_1$ to $C_{20}$ linear or branched hydrocarbon or a nonpolymeric aryl radical; and n is an integer of from about 75 to 10,000 and from about 0 to 75 parts by weight of a crosslinkable copolymer, the copolymer being present at least when the polyarylene oxide component is devoid of crosslinkable cites. The foregoing polymer or polymer mixture is crosslinked by a silicon-containing amine-terminated compound selected from the group consisting of the siloxanes having the formula

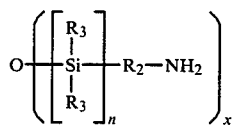

wherein $R_2$ is a $C_1$ to $C_{12}$ aliphatic radical or a $C_1$ to $C_{12}$ aliphatic radical containing a primary or secondary amine, $R_3$ is a $C_1$ to $C_{12}$ aliphatic radical or a $C_6$ to $C_{12}$ aryl radical, n is an integer of from about two to 2000 and x is 1 or 2, and silanes having the formula

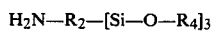

wherein $R_4$ is a $C_1$ to $C_{12}$ aliphatic radical.

The process of the present invention for the separation of gases from a mixture containing at least two gases comprises the step of passing the gas mixture over a permselective membrane composition wherein the membrane composition comprises a crosslinked polymer having from about 25 to 100 parts by weight of a polyarylene oxide having the formula

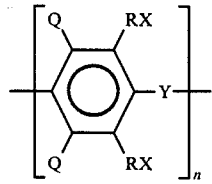

wherein R is a $C_1$ to $C_8$ aliphatic radical, a $C_5$ to $C_7$ cycloaliphatic radical, a $C_1$ to $C_8$ alkoxy radical, a $C_6$ to $C_{12}$ aryl radical, an aralkyl radical or an alkaryl radical, each radical being free of a tertiary alpha-carbon atom; X is H, Cl or Br; Y is a divalent oxygen or sulfur atom or a sulfonyl or carbonate group; Q is H, Cl, Br, or a sulfonyl radical of the formula

where $R_1$ is a $C_1$ to $C_{20}$ linear or branched hydrocarbon or a nonpolymeric aryl radical; and n is an integer of from about 75 to 10,000 and from about 0 to 75 parts by weight of a crosslinkable copolymer, the copolymer being present at least when the polyarylene oxide component is devoid of crosslinkable cites. The foregoing polymer or polymer mixture is crosslinked by a silicon-containing amine-terminated compound selected from the group consisting of the siloxanes having the formula

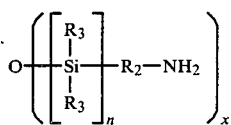

wherein $R_2$ is a $C_1$ to $C_{12}$ aliphatic radical or a $C_1$ to $C_{12}$ aliphatic radical containing a primary or secondary amine, $R_3$ is a $C_1$ to $C_{12}$ aliphatic radical or a $C_6$ to $C_{12}$ aryl radical, n is an integer of from about two to 2000 and x is 1 or 2, and silanes having the formula $$H_2N-R_2-[Si-O-R_4]_3 \qquad (III)$$

wherein $R_4$ is a $C_1$ to $C_{12}$ aliphatic radical.

PREFERRED MODE FOR CARRYING OUT THE INVENTION

An important feature of the present invention is the use of a crosslinked polymer utilizing a material that otherwise demonstrates good selective permeability for various gases. In the development of such a membrane it is desirable that the material provide improved membrane strength, the membrane should also be flexible and it should be easier to handle than existing membranes. By being crosslinked, the polymer membrane is imparted improved resistance to hostile environments, particularly solvents which are often carried residually in gas mixtures. If not otherwise separated in a pre-treatment step, the solvent contaminants will quickly dissolve other, known polymer membranes consequently shutting down the gas separation process.

Although crosslinking is important to impart the desirable properties and characteristics as have been just recited, equally important is that these can be obtained without a trade-off, i.e., no loss of permselectivity. Thus, not all crosslinking of polymer membranes that may be chemically possible is encompassed by the present invention but rather select instances where no loss of permselectivity occurs and preferably where improvements are obtained.

Practice of the present invention requires two major elements, at least one polymer and a crosslinking polymer. As to the first polymer, a number of known permselective polymers can be employed which are based on arylene monomers and their various derivatives. For purposes of discussion, the polymer membrane is referred to herein as a polyarylene which term encompasses the various polymers defined next.

Thus, suitable arylene monomers for practice of the present invention have the following formula

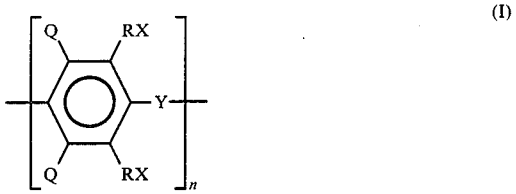

wherein R is a $C_1$ to $C_8$ aliphatic radical, a $C_5$ to $C_7$ cycloaliphatic radical, a $C_1$ to $C_8$ alkoxy radical, a $C_6$ to $C_{12}$ aryl radical, an aralkyl radical or an alkaryl radical, each radical being free of a tertiary alpha-carbon atom; X is H, Cl or Br; Y is a divalent oxygen or sulfur atom or a sulfonyl or carbonate group; Q is H, Cl, Br, or a sulfonyl radical of the formula

where $R_1$ is a $C_1$ to $C_{20}$ linear or branched hydrocarbon or a nonpolymeric aryl radical; and n is an integer of from about 75 to 10,000. Molecular weight of the polyarylene member can be low inasmuch as a more desirable, higher weight will result via crosslinking.

Exemplary aliphatic radicals include methyl, ethyl propyl and the like; exemplary cycloaliphatic radicals include cyclohexyl; exemplary aryl radicals include benzyl, naphthyl and alkyl substituted phenyl compounds such as methylphenyl, ethylphenyl, tolyl, xylyl and the like and, exemplary alkoxy radicals include methoxy, ethoxy, propoxy and the like.

$R_1$ in the definition of Q can be any linear or branched hydrocarbon having from one to about 20 carbon atoms including saturated compounds such as methyl, ethyl, propyl, butyl, t-butyl, octyl, hexadecyl and the like, as well as unsaturated, e.g., alkenes, alkynes and the like. Polyarylenes containing such Q groups can be prepared by a Friedel-Crafts synthesis by reacting the arylene monomer with an alkylsulfonyl halide under suitable conditions and with a catalyst.

$R_1$ can also be any nonpolymeric aryl radical, such as phenyl, tolyl, xylenyl and phenethyl. By nonpolymeric is meant that the aryl radical is not part of a polymer chain, i.e., the aryl radical of an arylene unit or in other words, the sulfone group, O=S=O, does not link two independent polymer strands. However, the aryl radical here includes multi-ring compounds such as biphenyl, naphthyl, diphenyloxide and the like. Preferred such aryl radicals are phenyl, tolyl, xylenyl and phenethyl.

Polyphenylene oxide (PPO) is a preferred material where both R groups are methyl, the Q groups are hydrogen and Y is oxygen. The weight average molecular weight of this material is typically at least about 20,000 and preferably at least about 50,000. The maximum weight average molecular weight is limited only by practical considerations, particularly the film-forming ability of the polymer, but typically it does exceed about 1,000,000 weight average molecular weight. These polymers and their preparation are defined at length in the above-referenced U.S. Pat. No. 3,350,844, the subject matter of which is incorporated herein by reference.

The foregoing polymer should contain ring or benzylic halogenation with bromine being preferred. As will be discussed hereinbelow, where the polyphenylene oxide or other polyarylene derivative membrane contains benzylic halogenation, it can be crosslinked directly. Halogenation can be provided in a conventional post-polymerization step and as such the technique by which this is achieved does not constitute a novel aspect of the present invention.

Dealing first with the situation where benzylic halogenation is not provided, it is necessary to form a mixture of the arylene oxide polymer and a compatible cross-linkable copolymer. One suitable material is the random copolymer of styrene and maleic anhydride, there being present an amount by weight of about 50 to 99 parts of styrene and from about 50 to one parts of maleic anhydride. Other monomers can be substituted for the styrene in equivalent amounts and would include o-, p- and alpha-methyl styrene and indene. A preferred crosslinkable copolymer contains 94 parts of styrene and six parts of maleic anhydride (94S/6MAH).

The mixture of polyarylene oxide and crosslinkable copolymers can comprise from about 25 to 100 parts by weight of PPO, or derivatives thereof, and from about 0 to 75 parts by weight of crosslinkable copolymer. It will be appreciated that the crosslinkable copolymer is mandatory where unmodified PPO is employed but is optional where crosslinkable functionality is available, e.g., benzylic halogenation. The mixture is formed by dissolving both polymers in an organic solvent such as chloroform, trichloroethylene, toluene or chlorobenzene to form a homogeneous solution. Where the membrane polymer is itself crosslinkable such as benzylic brominated PPO, a solution is likewise prepared.

To the foregoing solution of membrane polymer, with or without the crosslinkable polymer, is added an aminofunctional crosslinker. The crosslinkers of the present invention are primarily silicon-containing and amineterminated. Of these there are two types, the siloxanes having the formula

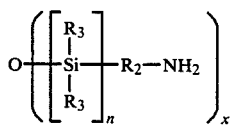

(II)

wherein $R_2$ is a $C_1$ to $C_{12}$ aliphatic radical or a $C_1$ to $C_{12}$ aliphatic radical containing a primary or secondary amine, $R_3$ is a $C_1$ to $C_{12}$ aliphatic radical or a $C_6$ to $C_{12}$ aryl radical, n is an integer of from about two to 2000 and x is 1 or 2, and silanes having the formula $$H_2N-R_2-[Si-O-R_4]_3 \quad (III)$$

wherein $R_4$ is a $C_1$ to $C_{12}$ aliphatic radical.

The amines are preferably primary in both instances and typical of the siloxanes would be polydimethylsiloxanes, where both ends of the polymer chain are amineterminated and/or aminoalkyl groups are located at various branch points and, typical of the silanes would be aminopropyl-triethoxysilane and silicon tetraethoxysilane. Any known siloxane or silane having at least two amino groups, whether the groups are end, branch or combinations thereof, can be employed. Amounts of the silicon-containing amineterminated crosslinker range from about one to about 50 parts by weight based upon 100 parts of the crosslinkable polymers in the solution.

The process of this invention is suitable for separating any one of a number of different gases such as hydrogen, helium, nitrogen, oxygen, carbon monoxide, carbon dioxide, hydrogen sulfide, ammonia, water (vapor) and $C_1$ to $C_4$ hydrocarbons from mixtures containing the same. Typical gas mixtures where separation is desirable include $H_2/N_2$; $H_2/CO$; $H_2/C_1$ to $C_4$; $H_2/O_2$; $H_2/NH_3$; $CO_2/C_1$ to $C_4$; $CO_2/N_2$; $H_2S/C_1$ to $C_4$; $O_2/N_2$; $N_2/NH_3$; $He/C_1$ to $C_4$; $H_2S/C_1$ to $C_4$ and $H_2O/C_1$ to $C_4$. The membrane can also be employed for the separation of mixtures comprising three gases or more. It is to be understood that not all gas pairs or mixtures will be separated optimally over a given membrane of the present invention. So long as the membrane exhibits a selectivity for at least one gas in a mixture, it has utility for that particular mixture. The semipermeable membranes of this invention find particular utility for the separation of gaseous carbon dioxide-methane mixtures into their constituent parts, i.e., enriched fractions of carbon dioxide and methane.

In the examples reported hereinbelow, the separation of $CO_2/CH_4$ has been selected to demonstrate the use of the novel permeselective membrane of the present invention. Membranes comprising unmodified PPO as well as brominated PPO were prepared and compared with various crosslinked species and have established the necessity of silicon containing crosslinkers to provide the desired effects in permselectivity.

Selectivity, as is known, in a comparison of the permeability, $\overline{P}$, of one gas divided by the permeability of the second gas in the mixture. Normally, the less permeable member of the gas pair is placed in the denominator and the selectivity factor will be a number greater than one. Permeability, in turn, is customarily calculated according to the relationship $$\overline{P} = \frac{(cc)(cm)}{(sec)(cm^2)(cmHg)}$$

where cc is the volume of the permeating gas at standard temperature and pressure, cm is the thickness of the membrane, sec is the time in seconds for a given amount of gas to be permeated, $cm^2$ is the area of the membrane and cmHg is the pressure differential over the membrane in cm of mercury. Permeability as such as reported in Barrers, one Barrer being equal to $1 \times 10^{-10}$ $\overline{P}$. Gas pressures on the membranes of this invention can range from about 0.10 to 200 MPa with five to 100 MPa being preferred.

All of the polymer membrane films reported hereinbelow were prepared from a solution of the components in chloroform which were mixed for one minute with the cross-linker, were employed, and then cast over a glass plate. Upon drying, the membrane resulted which was then tested with a modified Gilbert cell. The test side was exposed to a carbon dioxide/methane/nitrogen mixture in a mole ratio of 2.99:32:65. The permeant was picked up by a carrier gas, helium, and injected intermittently through a sample valve into a GC column for analysis. The experiments were conducted at 23° C., the partial pressure of the test gas on the feed side was 0.21 MPa and the partial pressure of the product gas on the permanent side was about 0, and purged with 0.21 MPa helium at a flowrate much in excess of the permeation rate. The area of the test membrane was about 45.8 square sm.

EXAMPLES 1–8

Examples 1–8 are reported in Table I. Benzylic brominated PPO containing 13 weight percent bromine was selected as the membrane forming polymer for each. It was cast as a film in the manner set forth hereinabove and for Example No. 1, was uncrosslinked. Example No. 2 was cross-linked with 16.6 weight percent of an amineterminated polyoxypropylene, Jeffamine D-2000 commercially available from Texaco for a compound having a molecular weight of 2000. Examples No. 3 and 4 were crosslinked with aminopropyltriethoxysilane and silicon tetraethoxysilane. Examples No. 5–7 were crosslinked with amineterminated polysiloxane, designated PS-510, available from Petrarch Systems and Example No. 8 was reacted with 33 weight percent p-phenylphenyl amine.

TABLE I

The Permselectivity of Crosslinked Films from Benzylic Brominated PPO

| Ex. No. | Polymer | $\bar{P}CO_2$ In Barrers | Selectivity $CO_2/CH_4$ | Solubility in $CHCl_3$ |
|---|---|---|---|---|
| 1 | PPO 13 wt. % Br | 69 | 21 | Soluble |
| 2 | Crosslinked with 16.6 wt. % Jeffamine D-2000 | 29 | 18 | Insoluble |
| 3 | Crosslinked with 8.6 wt. % $H_2NC_3H_7$ Si(OEt)$_3$ | 62 | 20 | Insoluble |
| 4 | Crosslinked with 4.3 wt. % $H_2NC_3H_7$ Si(OEt)$_3$ 4.3 wt. % Si(OEt)$_4$ | 66 | 20 | Insoluble |
| 5 | Crosslinked with 7.5 wt. % PS-510 | 68 | 18 | Insoluble |
| 6 | Crosslinked with 16.6 wt. % PS-510 | 86 | 18 | Insoluble |
| 7 | Crosslinked with 33 wt. % PS-510 | 88 | 16 | Insoluble |
| 8 | Reacted with 33 wt. % p-phenylphenyl amine | 5.6 | 10 | Soluble |

In Table I, six of the membranes were found to be insoluble in chloroform, confirming that crosslinking had been achieved. Example No. 1, serving as a control, showed good selectivity and $\bar{P}$ for $CO_2$, however, being uncross-linked, it is not solvent resistant. Crosslinking with Jeffamine D-2000 reduced $\bar{P}CO_2$ by a factor of two, demonstrating that the permeability characteristics of these membranes are dependent upon specific crosslinkers. This is to be expected as normally when a polymer is crosslinked a reduction in permeability is noted.

The use of aminopropyltriethoxysilane and a mixture of aminopropyltriethoxysilane/tetraethoxysilane as crosslinkers, Examples 3 and 4, resulted in no substantial negative effect on permeability. Polymers crosslinked with different levels of aminoterminated polysiloxane, Examples 5–7, actually were equal to or better than the control polymer, Example 1, in $CO_2$ permeability. Polydimethylsiloxane has a $CO_2$ permeability exceeding 2,000 Barrers, but is not selective ($CO_2/CH_4$ selectivity is 4). Unexpectedly, amino crosslinkers containing silicon do not reduce the permeability. The $CO_2$ permeability was increased with respect to the charge of aminosiloxane up to about 17 weight percent, Example 6, resulting in 86 Barrer. It can also be noted that a higher loading of aminosiloxane did not improve the permeability further, and resulted in a drop in selectivity, Example 7.

Lastly, the addition of a simple mono-amino compound, such as p-phenylphenylamine, Example 8, caused a drop in permeability and selectivity, and resulted in no crosslinking.

EXAMPLES 9–12

Examples 9–12 are reported in Table II. A benzylic and ring brominated PPO containing a total of 32 weight percent bromine was selected as the membrane forming polymer for each. Again, each film was solvent cast. Example No. 9 was uncrosslinked and served as a control. Examples No. 10–12 were crosslinked with PS-510, Jeffamine D-2000 and Jeffamine T-400 (molecular weight 400), respectively.

TABLE II

The Permeability of Crosslinked Films from Benzylic/Ring Brominated PPO

| Ex. No. | Polymer | $\bar{P}CO_2$ In Barrers | Selectivity $CO_2/CH_4$ | Solubility in $CHCl_3$ |
|---|---|---|---|---|
| 9 | PPO 32 wt. % total Br | 97 | 23 | Soluble |
| 10 | Crosslinked with 16.6 wt. % PS-510 | 134 | 16.2 | Insoluble |
| 11 | Crosslinked with 16.6 wt. % Jeffamine D-2000 | 23 | 20 | Insoluble |
| 12 | Crosslinked with 16.6 wt. % Jeffamine T-400 | 10.4 | 16 | Insoluble |

When the PPO was brominated at the benzene ring, and then at the benzylic position, a polymer with two types of bromide was formed and only the benzylic bromide was reactive. Treated with organic amine functional cross-linkers (D-2000 bis-amine, and T-400 tris-amine), a reduction in permeability was observed, Examples 11 and 12. The tris-amine (T-400) caused more drastic reduction in permeability than the bis-amine (D-2000), and was most likely attributable to tighter crosslinked structures. As in Table I, the bis-aminosiloxane PS-510 gave improved permeability although accompanied by a slight reduction in selectivity.

EXAMPLES 13–15

Examples 13–15 are reported in Table III. The unmodified PPO polymer, supplied by Aldrich Chemical Co., was selected as the membrane forming polymer for each, in the preparation of solvent cast films. Example No. 13 was uncrosslinkable and served as a control. Examples No. 14 and 15 were each first mixed with Dylark 232 and random copolymer of styrene and maleic anhydride (94S/6MAH) a resin, supplied by Arco Chemical Co., in order to provide crosslink cites to the PPO following which they were crosslinked with PS-510.

TABLE III

The Permeability of Crosslinked PPO Films

| Ex. No. | Polymer | PCO$_2$ In Barrers | Selectivity CO$_2$/CH$_4$ | Solubility in CHCl$_3$ |
|---|---|---|---|---|
| 13 | PPO | 87 | 18 | Soluble |
| 14 | Crosslinked with 16.6 wt. % S/MAH (Dylark 232) 16.6 wt. % PS-510 | 105 | 18 | Insoluble |
| 15 | Crosslinked with 33.3 wt. % Dylark 232 33.3 wt. % PS-510 | 139 | 15.2 | Insoluble |

Unmodified PPO, Example 13, had no reactive functionalities and, therefore, would not crosslink or even blend with aminofunctional crosslinkers. The three-component blend, forming a part of the present invention, is reported in Examples 14 and 15. The presence of the S/MAH copolymer is the blend was critical in rendering it cross-linkable by way of an anhydride-amine reaction. The permeability characteristics of these crosslinked PPO films were similar to the previous findings in Tables I and II although the bis-aminosiloxane crosslinked films were more permeable than any of the controls. Some loss of selectivity was observed at higher siloxane loadings, Example 15.

EXAMPLES 16–20

Examples 16–20 are reported in Table IV. A ring brominated PPO film was selected as the membrane forming polymer for each, in the preparation of solvent cast films. Example No. 16 was uncrosslinked and served as a control. For Example 17 the ring brominated PPO film was mixed with Dylark 232 copolymer and crosslinked with Jeffamine D-2000. Example 18, exemplifying the present invention, comprised the ring brominated PPO film, Dylark 232 and PS-510. Examples 19 and 20 were comparative, the ring brominated film being blended and cast with polysulfone and Dylark 232, respectively.

TABLE IV

The Permeability of Crosslinked Ring Brominated PPO Films

| Ex. No. | Polymer | PCO$_2$ In Barrers | Selectivity CO$_2$/CH$_4$ | Solubility in CHCl$_3$ |
|---|---|---|---|---|
| 16 | PPO 35 wt. % Br | 170–180 | 20 | Soluble |
| 17 | Crosslinked with 16.6 wt. % S/MAH (Dylark 232) 16.6 wt. % D-2000 | 28 | 14 | Insoluble |
| 18 | Crosslinked with 16.6 wt. % Dylark 232 16.6 wt. % PS-510 | 226 | 16 | Insoluble |
| 19 | Blended with 16.6 wt. % Dylark 232 | 81 | 17 | Soluble |
| 20 | Blended with 50 wt. % Polysulfone | 30 | 31 | Soluble |

The ring brominated PPO was the best membrane forming polymer in terms of CO$_2$/CH$_4$ separation. With CO$_2$ permeability of 170–180 Barrers and CO$_2$/CH$_4$ selectivity of 20, this brominated PPO film exceeded all other known polymer films in terms of dense film performance. Cross-linking of ring brominated PPO cannot be affected due to the lack of reactivity of the aromatic bromide functionality and therefore, Dylark 232 was employed. A three component blend similar to the ones used for PPO as reported in Table III was found to lead to successfully crosslinked films.

In Example 17, the ordinary non-silicon bis-amine crosslinker, D-2000/Dylark blend, resulted in a six-fold reduction of permeability, with no benefit in selectivity. When crosslinked with bisaminosiloxane, however, the ring brominated PPO/Dylark blend again gave enhanced permeability, as noted in Example 18. Finally, when ring brominated PPO was blended with S/MAH copolymer (Dylark) above, no crosslinking and no enhancement in permeability was observed. A typical blend containing ring brominated PPO and polysulfone was also similar in properties. These results characterize Emamples 19 and 20, respectively.

Based upon the results appearing in Tables I to IV, it can be seen that crosslinking the arylene oxide polymer with an amineterminated silicon-containing cross-linker provides a stable or solvent resistant membrane without deleteriously effecting permeability and selectiveness. The PPO must either be modified, carrying a cross-linkable cite, e.g., benzylic bromine, or it must be blended with a crosslinkable copolymer such as poly(styrene-co-maleic anhydride).

It is to be understood that the novel permselective membranes of the present invention can comprise other components than the brominated PPO and specific amineterminated silicon-containing crosslinkers exemplified herein, the examples having been provided merely to demonstrate practice of the subject invention. Those skilled in the art may readily select other modified polyarylenes and crosslinkers according to the disclosure made hereinabove. Similarly, when the arylene polymer lacks crosslinkable cites, crosslinkable copolymers are to be blended therewith including but not limited to poly(styrene-co-maleic anhydride).

Lastly, although operability of the process to separate CO$_2$ from CH$_4$ has been demonstrated herein, the membrane of the present invention and process for separating gases therewith can be employed with other gas mixtures so long as the members of a given pair have different permeability rates from each other.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

I claim:

1. A permselective membrane composition for the separation of gases from a mixture containing at least two gases comprising:

from about 25 to 100 parts by weight of a polyarylene having the formula

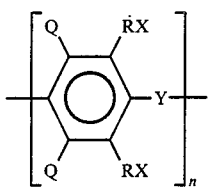

wherein R is a $C_1$ to $C_8$ aliphatic radical, a $C_5$ to $C_7$ cycloaliphatic radical, a $C_1$ to $C_8$ alkoxy radical, a $C_6$ to $C_{12}$ aryl radical, an aralkyl radical or an alkaryl radical, each radical being free of a tertiary alpha-carbon atom; X is H, Cl or Br; Y is a divalent oxygen or sulfur atom or a sulfonyl or carbonate group; Q is H, Cl, Br, or a sulfonyl radical of the formula

where $R_1$ is a $C_1$ to $C_{20}$ linear or branched hydrocarbon or a nonpolymeric aryl radical; and n is an integer of from about 75 to 10,000;

from about 0 to 75 parts by weight of a crosslinkable copolymer, the copolymer being present at least when the polyarylene component is devoid of crosslinkable cites; and from about one to 50 parts by weight, based upon the total weight of said polyarylene and crosslinkable copolymer, of a silicon-containing amineterminated compound selected from the group consisting of the siloxanes having the formula

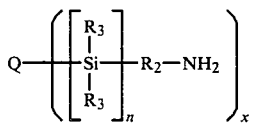

wherein $R_2$ is a $C_1$ to $C_{12}$ aliphatic radical or a $C_1$ to $C_{12}$ aliphatic radical containing a primary or secondary amine, $R_3$ is a $C_1$ to $C_{12}$ aliphatic radical or a $C_6$ to $C_{12}$ aryl radical, n is an integer of from about two to 2000 and x is 1 or 2, and silanes having the formula

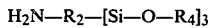

wherein $R_4$ is a $C_1$ to $C_{12}$ aliphatic radical.

2. A permselective membrane composition, as set forth in claim 1, wherein said polyarylene is present in an amount of 100 parts, said R is methyl, one X is bromine and the other X is hydrogen, Y is oxygen, Q is hydrogen and n is 100 to 3000.

3. A permselective membrane composition, as set forth in claim 2, wherein said silicon-containing amine-terminated compound is aminopropyl terminated polydimethylsiloxane.

4. A permselective membrane composition, as set forth in claim 2, wherein said silicon-containing amine-terminated compound comprises aminopropyltriethoxysilane, silicon tetraethoxysilane and mixtures thereof.

5. A permselective membrane composition, as set forth in claim 1, comprising 100 total parts of said polyarylene and said crosslinkable copolymer wherein said R is methyl, said X is hyrdrogen, Y is oxygen, Q is hydrogen and n is 100 to 3000.

6. A permselective membrane composition, as set forth in claim 5, wherein said polyarylene is present in an amount of 75 parts and said crosslinkable copolymer is present in an amount of 25 parts, said copolymer comprising a random copolymer containing maleic anhydride.

7. A permselective membrane composition, as set forth in claim 6, wherein said copolymer comprises poly(styrene-co-maleic anhydride).

8. A permselective membrane composition, as set forth in claim 7, wherein said silicon-containing amine-terminated compound is aminopropyl terminated polydimethylsiloxane.

9. A permselective membrane composition, as set forth in claim 7, wherein said silicon-containing amine-terminated compound comprises aminopropyltriethoxysilane, silicon tetraethoxysilane and mixtures thereof.

10. A permselective membrane composition, as set forth in claim 1, comprising 100 total parts of said polyarylene and said crosslinkable copolymer wherein said R is methyl, said X is hydrogen, Y is oxygen, one Q is bromine and the other Q is hydrogen and n is 100 to 3000.

11. A permselective membrane composition, as set forth in claim 10, wherein said polyarylene is present in an amount of 75 parts and said crosslinkable copolymer is present in an amount of 25 parts, said copolymer comprising a random copolymer containing maleic anhydride.

12. A permselective membrane composition, as set forth in claim 11, wherein said copolymer comprises poly(styrene-co-maleic anhydride).

13. A permselective membrane composition, as set forth in claim 11, wherein said silicon-containing amine-terminated compound is aminopropyl terminated polydimethylsiloxane.

14. A permselective membrane composition, as set forth in claim 11, wherein said silicon-containing amine-terminated compound comprises aminopropyltriethoxysilane, silicon tetraethoxysilane and mixtures thereof.

15. A process for the separation of gases from a mixture containing at least two gases comprising the step of:
passing said mixture over a permselective membrane composition wherein said membrane composition is formed by
a polymer membrane having
from about 25 to 100 parts by weight of a polyarylene having the formula

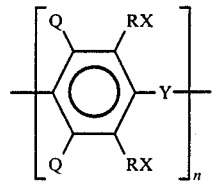

wherein R is a $C_1$ to $C_8$ aliphatic radical, a $C_5$ to $C_7$ cycloaliphatic radical, a $C_1$ to $C_8$ alkoxy radical, a $C_6$ to $C_{12}$ aryl radical, an aralkyl radical or an alkaryl radical, each radical being free of a tertiary alpha-carbon atom; X is H, Cl or Br; Y is a divalent oxygen or sulfur atom or a sulfonyl or carbonate group; Q is H, Cl, Br, or a sulfonyl radical of the formula $$O=S=O$$
$$|$$
$$R_1$$

where $R_1$ is a $C_1$ to $C_{20}$ linear or branched hydrocarbon or a nonpolymeric aryl radical; and n is an integer of from about 75 to 10,000;

from about 0 to 75 parts by weight of a crosslinkable copolymer, the copolymer being present at least when the polyarylene component is devoid of crosslinkable cites; and from about one to 50 parts by weight, based upon the total weight of said polyarylene and crosslinkable copolymer, of a silicon-containing amineterminated compound selected from the group consisting of the siloxanes having the formula

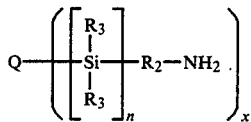

wherein $R_2$ is a $C_1$ to $C_{12}$ aliphatic radical or a $C_1$ to $C_{12}$ aliphatic radical containing a primary or secondary amine, $R_3$ is a $C_1$ to $C_{12}$ aliphatic radical or a $C_6$ to $C_{12}$ aryl radical, n is an integer of from about two to 2000 and x is 1 or 2, and silanes having the formula $$H_2N-R_2-[Si-O-R_4]_3$$

wherein $R_4$ is a $C_1$ to $C_{12}$ aliphatic radical.

16. A process, as set forth in claim 15, comprising 100 parts of said polyarylene wherein said R is methyl, one X is bromine and the other X is hydrogen, Y is oxygen, Q is hydrogen and n is 100 to 3000.

17. A process, as set forth in claim 16, wherein said silicon-containing amineterminated compound is aminopropyl terminated polydimethylsiloxane.

18. A process, as set forth in claim 16, wherein said silicon-containing amineterminated compound comprises aminopropyltriethoxysilane, silicon tetraethoxysilane and mixtures thereof.

19. A process, as set forth in claim 15, comprising 100 total parts of said polyarylene and said crosslinkable copolymer wherein said R is methyl, said X is hydrogen, Y is oxygen, Q is hydrogen and n is 100 to 3000.

20. A process, as set forth in claim 19, wherein said polyarylene is present in an amount of 75 parts and said crosslinkable copolymer is present in an amount of 25 parts, said copolymer comprising a random copolymer containing maleic anhydride.

21. A process, as set forth in claim 20, wherein said copolymer comprises poly(styrene-co-maleic anhydride).

22. A process, as set forth in claim 21, wherein said silicon-containing amineterminated compound is aminopropyl terminated polydimethylsiloxane.

23. A process, as set forth in claim 21, wherein said silicon-containing amineterminated compound comprises aminopropyltriethoxysilane, silicon tetraethoxysilane and mixtures thereof.

24. A process, as set forth in claim 15, comprising 100 total parts of said polyarylene and said crosslinkable copolymer wherein said R is methyl, said X is hydrogen, Y is oxygen, one Q is bromine and the other Q is hydrogen and n is 100 to 3000.

25. A process, as set forth in claim 24, wherein said polyarylene is present in an amount of 100 parts and said crosslinkable copolymer is present in an amount of 25 parts, said copolymer comprising a random copolymer containing maleic anhydride.

26. A process, as set forth in claim 25, wherein said copolymer comprises poly(styrene-co-maleic anhydride).

27. A process, as set forth in claim 26, wherein said silicon-containing amineterminated compound is aminopropyl terminated polydimethylsiloxane.

28. A process, as set forth in claim 26, wherein said silicon-containing amineterminated compound comprises aminopropyltriethoxysilane, silicon tetraethoxysilane and mixtures thereof.

29. A process, as set forth in claim 15, wherein said mixture of gases comprises hydrogen, helium, oxygen, nitrogen, carbon monoxide, carbon dioxide, hydrogen sulfide, ammonia, water vapor and $C_1$ to $C_4$ hydrocarbons.

30. A process, as set forth in claim 29, wherein said mixture of gases comprises carbon dioxide and methane.

31. A process, as set forth in claim 30, wherein said permselective membrane composition has a carbon dioxide permeability of at least about 60 Barrers.

32. A process, as set forth in claim 31, wherein said permselective membrane composition has a selectivity of from about 15 to 25.

33. A process, as set forth in claim 15, wherein said separation of gases is conducted at a pressure of from about 0.10 to about 200 MPa.

* * * * *